July 12, 1927.
A. DICK ET AL
1,635,612
AGRICULTURAL MACHINE
Filed June 1, 1926
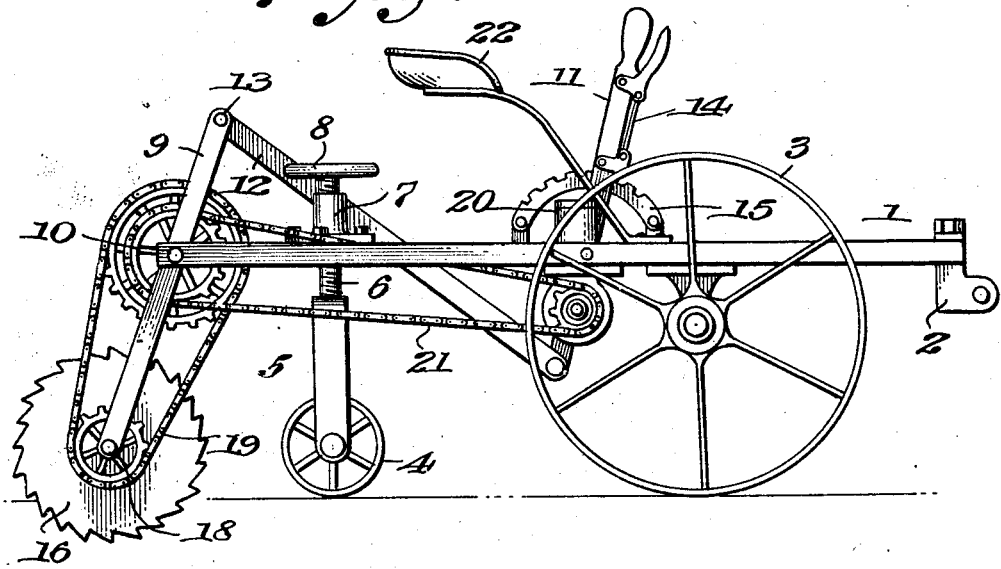
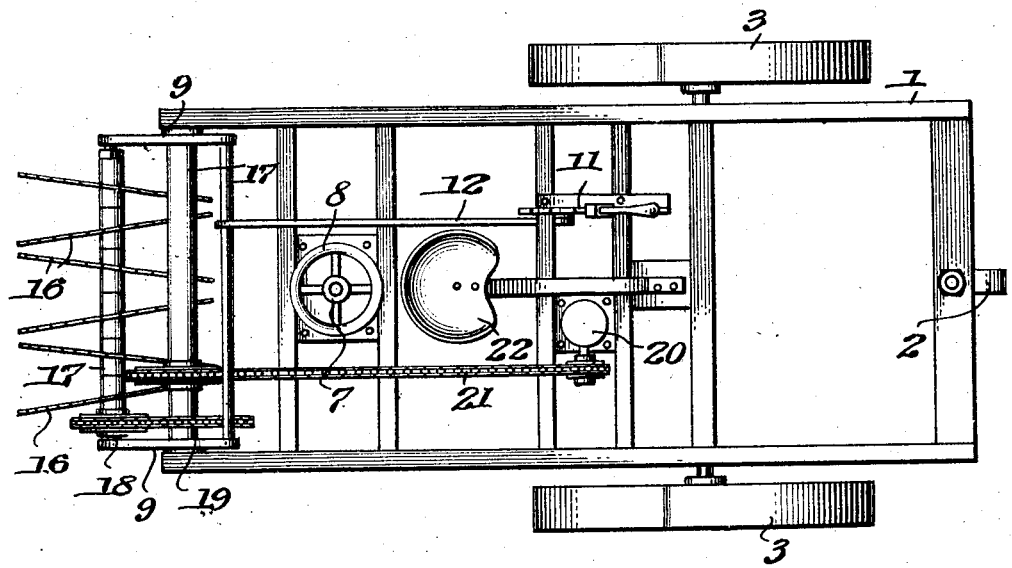

Patented July 12, 1927.

1,635,612

UNITED STATES PATENT OFFICE.

ARTHUR DICK AND JACOB AUGUST DIRSCHAUER, OF EVANSVILLE, INDIANA.

AGRICULTURAL MACHINE.

Application filed June 1, 1926. Serial No. 112,906.

This invention relates to an agricultural machine intended for use in pulverizing soil, destroying weeds, wild onion sprouts, cutworms and the like and which will serve the purpose of a plow, harrow, drag, and other soil treating machines, the object being to provide in a single machine improvements which will serve the purposes of the different machines enumerated.

The objects of the invention are accomplished by the provision of toothed or sawlike discs of improved construction relatively arranged in a novel manner so that they converge in pairs and collectively act on the soil to disintegrate it, destroy weeds, undesirable growths, worms, etc., the gang of special discs being mounted for raising or lowering as a unit and also for setting to accomplish any desired depth of penetration of the soil.

The machine carries a motor or engine, such as an internal combustion engine, for rapidly rotating the earth treating discs. The machine itself may carry its own propelling means, or, it may be drawn by a tractor or horses. In fact, if constructed of small size for garden cultivation, it may be propelled by hand but, preferably, it should have a small internal combustion engine for rapidly rotating the pulverizing discs if it be used for garden cultivation. In the regular size embodiments of the invention some power means for driving the discs should be used whether the machine be self-propelled, drawn by a tractor, or by animals.

One embodiment of the invention is shown in the accompanying drawings in which:—

Figure 1 is a side elevation and

Figure 2 is a plan view.

The frame of the machine appears at 1 and, in the form shown, it is provided with a clevis 2 by which it may be drawn by a tractor or horses. The machine may have its own self-contained propelling mechanism, if desired.

Main wheels 3 suitably support the frame 1 and there is also a combined trailer and depth regulating wheel 4 which is carried by a fork 5 having a screw stem 6 which is engaged with screw threads inside of a box 7 carried by the central part of the frame 1. A hand wheel 8 secured to the stem 6, enables the fork and stem to be fed upwardly or downwardly to regulate the position of the rear part of the frame 1 and thus regulate the depth of the cut made by the serrated or saw tooth cutters or discs, soon to be described.

A tiltable frame 9 is mounted on a shaft 10 so that the lower, rear end thereof may be swung upwardly or downwardly. This is accomplished by a lever 11 having a link connection 12 with a cross rod 13 of the frame 9. The lever may be locked in any desired position by the engagement of a latch 14 carried thereby with a toothed segment 15 on the frame 1.

Our improved cultivating and pulverizing disks are shown at 16. These disks have serrated or saw-tooth edges so that they will have a combined cutting and tearing action. They are arranged so that adjoining disks converge as shown in Fig. 2, the convergence being alternately at the front and to the rear of the disks. The disks are carried by collars or hubs 17 which are carried by a shaft 18 mounted in the rear and lower part of the frame 9. Shaft 18 is connected by chain and sprocket gearing 19 to the shaft 10.

An internal combustion engine 20, or other suitable power plant, mounted on the frame 1 is connected by a chain and sprocket gearing 21 to the shaft 10. The chain and sprocket gearings 19 and 21 are of such ratio that the engine 20 will drive the cultivating and pulverizing disks 16 at a very high rate of speed.

The driver's or operator's seat appears at 22.

When it is desired to change the depth of the entry of the disks 16 in the soil, adjustment is had by turning the hand wheel 8. Adjustment may also be had by operating the lever 11 to set it in a different position. Thus, the depth of a cut which may be continued for some time may be arranged by turning the hand wheel 8. Variations of the depth of cut may be had quickly and easily by shifting the lever 11. The said lever is also used for withdrawing the disks 16 from the soil.

We are aware that modifications may be resorted to in carrying out this invention and we do not, therefore, limit ourselves to the precise construction shown and described.

What we claim is:

1. In an agricultural machine, a gang of soil treating disks having serrated or saw-tooth peripheries having a common axis of revolution and arranged in pairs which converge in each instance.

2. In an agricultural machine, a gang of soil-treating disks having a common axis of revolution and arranged so that the adjoining disks converge, the convergence between adjacent disks being alternately at one edge and at the opposite edge of the disks.

3. In an agricultural machine, a gang of soil-treating disks having a common axis of revolution, the respective disks being inclined in relation to the adjoining disk, said disks collectively being arranged in zig-zag fashion.

In testimony whereof we affix our signatures.

ARTHUR DICK.
JACOB AUGUST DIRSCHAUER.